Aug. 7, 1934.  L. POGLEIN  1,969,577
MOLD FOR GLASSWARE
Filed April 25, 1932   2 Sheets-Sheet 1

INVENTOR
Louis Poglein,
By Archworth Martin,
Attorney.

Aug. 7, 1934.    L. POGLEIN    1,969,577
MOLD FOR GLASSWARE
Filed April 25, 1932    2 Sheets-Sheet 2
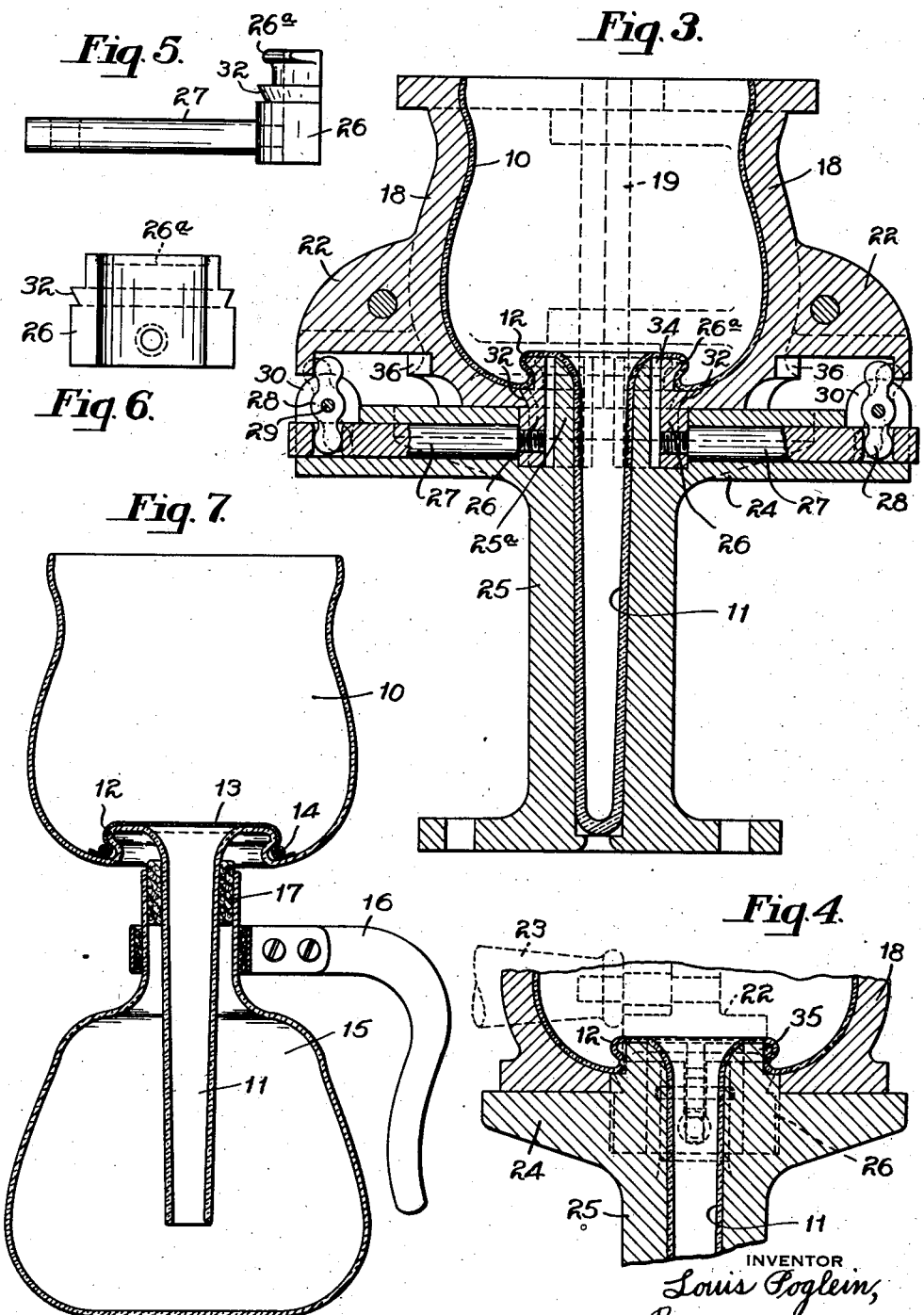

Patented Aug. 7, 1934

1,969,577

UNITED STATES PATENT OFFICE 1,969,577

MOLD FOR GLASSWARE

Louis Poglein, Jeannette, Pa., assignor to McKee Glass Company, Jeannette, Pa., a corporation of Pennsylvania Application April 25, 1932, Serial No. 607,238

12 Claims. (Cl. 49—69)

My invention relates to molds for making glassware, and more particularly to molds for forming ware of irregular shape, such as stemmed bowls or funnels used in connection with coffee percolators. It will be understood, of course, that the invention is capable of use in forming ware of other shapes and for other purposes.

One object of my invention is to provide a mold wherein glassware having a re-entrant curved portion may be formed.

Another object of my invention is to provide a mold wherein blown glassware may be formed with a bowl and hollow stem joined by an overhanging shoulder portion.

Another object of my invention is to provide a mold of improved form for forming funnel-like ware.

Figure 1:
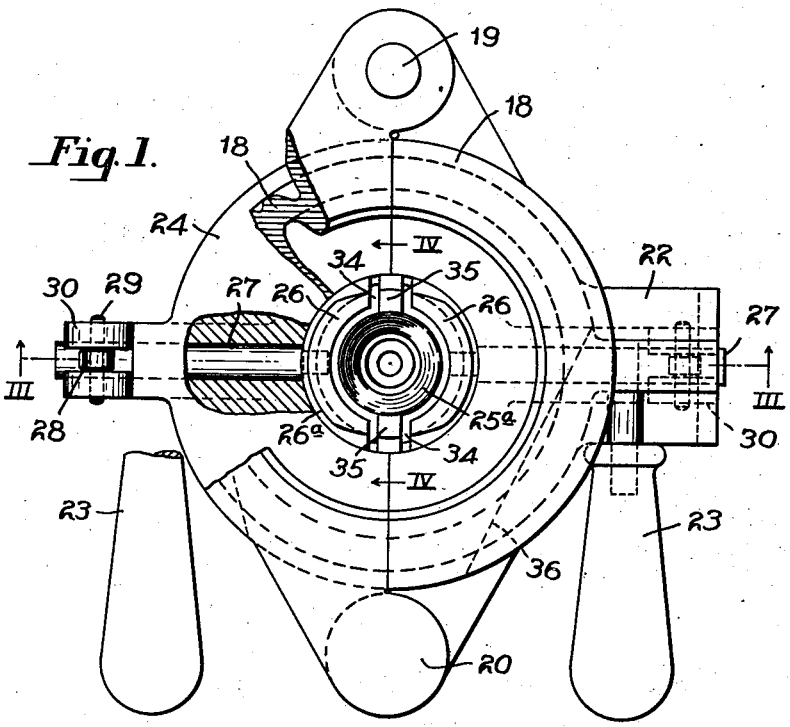
Figure 2:
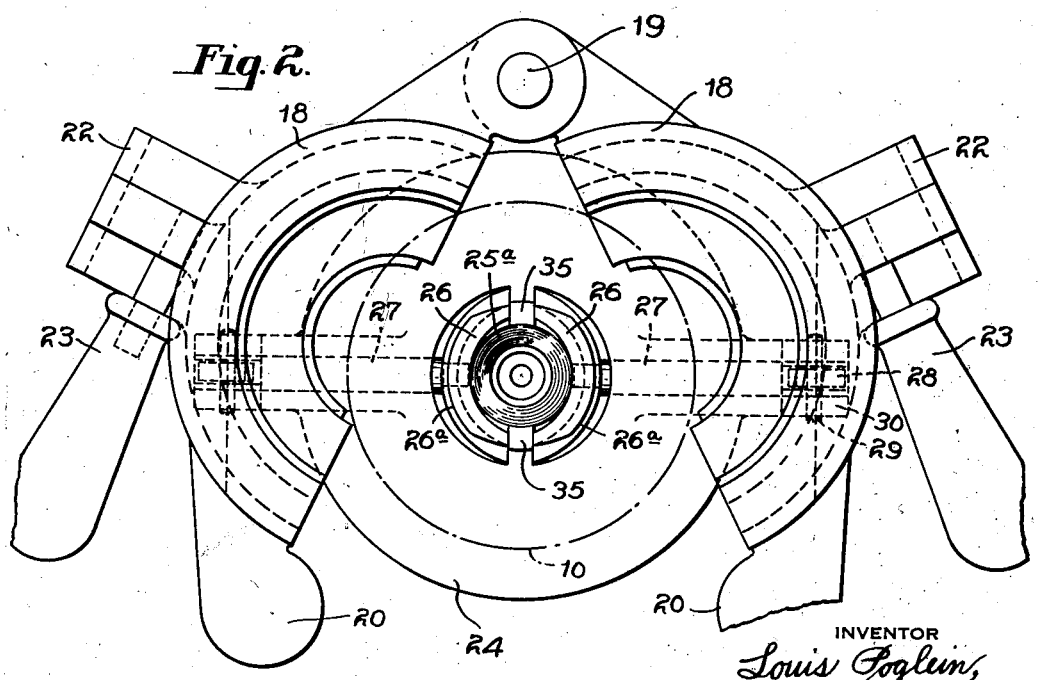

One form which my invention may take is shown in the accompanying drawings wherein Figure 1 is a sectional plan view of the mold when closed; Fig. 2 is a plan view thereof in open position; Fig. 3 is a vertical sectional view taken on the line III—III of Fig. 1; Fig. 4 is a fragmentary view taken on the line IV—IV of Fig. 1; Fig. 5 is an enlarged detailed view of one of the mold members of Fig. 3; Fig. 6 is an end view of the structure of Fig. 5, and Fig. 7 is a sectional view showing a completed bowl, and one manner in which it may be put to use.

In order that the contours of the mold cavity may be better understood, I will first describe the article formed therein. The article consists of a blown glass funnel or bowl 10 having a stem portion 11, and a re-entrant portion 12 formed integrally with and connecting the stem and the bowl.

The bowl 10 is shown in the drawings as utilized in connection with a coffee percolator. A screen or filter cloth 13 overlies the shoulder 12 and is detachably clamped in position against the underside of said shoulder by a split metal ring 14. The stem 11 extends into a bowl 15, packing material 17 being interposed between the neck of the bowl 15 and the stem 11. The bowl 15 is provided with a bracket arm or handle 16, by means of which the bowl may be supported to pour the contents thereof.

In use, coffee is introduced into the bowl 10. The bowl 15 contains water and is subjected to heat to vaporize a portion of the water, sufficient steam pressure being generated therein to force the water up through the stem 11 into the bowl 10. When the temperature at the bowl 15 is reduced, the water or liquid in the bowl 10 will seep through the coffee grounds and the screen 13, and flows through the spout 11 as brewed coffee. The over-hanging shoulder 12 and the ring 14 serve as a convenient means for holding the screen in place and permit the bowl 10 and the stem 11 to be formed integrally, instead of in separate parts, thereby avoiding the necessity of a joint and connecting means therefor, which makes for simplicity of handling and cleaning, besides reducing the number of crevices which may become filled with contaminated matter. When the coffee has been brewed, the bowl 10 can be lifted out and the contents of the bowl 15 then poured.

The mold structure includes a pair of half mold sections 18 which are hinged together at 19 in any manner well-known in the art, and which may be provided with suitable fastening means at the lugs 20, if desired. The half mold sections 18 have bosses or extensions 22 that support handles 23 for opening and closing the mold. The mold sections 18 are supported for sliding movement on a mold bottom 24, and a stem mold portion 25 having a portion 25a extending upwardly through the bottom plate 24 and into the space between the mold sections 18. The stem mold 25 is tapered and therefore need not be split, since the blown glass can be readily lifted therefrom as hereinafter explained.

Surrounding the upper portion 25a of the stem mold 25 are a pair of neck molds 26 which may be somewhat less than semi-circular as shown more clearly in Fig. 1. These neck molds 26 have overhanging curved shoulders or beads 26a about which the shoulder 12 of the bowl is formed. When the neck molds 26 are in operative position, they lie in spaced relation to the stem mold 25, as shown more clearly in Fig. 3. Operating rods 27 are connected to the mold members 26 and are slidably supported in guideways beneath the bottom plate 24. The rods 27 are recessed adjacent to their outer ends for the reception of the lower ends of levers 28 that are pivotally supported on pins 29 which extend through upstanding wings 30 that are carried by the bottom plate 24.

The bosses 22 have radially-extending slots therein for receiving the upper ends of the levers 28, the end walls of the slot serving to engage the upper ends of said levers when the mold sides 18 are swung open and closed, as hereinafter explained.

With the parts in the position shown in Fig. 3, the rods 27 are held in their outermost positions by the levers 28, with their angular shoulders in engagement with complementally-formed surfaces at the lower edges of the side molds 18. The walls of the mold cavity are preferably paste lined, or of material which will permit rotation of the glass therein while it is being expanded by a blow pipe. A charge of glass supported from a blow pipe in the usual manner is introduced into the bowl portion of the mold cavity, and is blown to expand the same to cause it to engage the mold sides 18, and to flow into the stem mold 25. Simultaneously, rotative movement is imparted to the glass by twisting the blow pipe, to secure the desired smoothing action, and to form the circular shoulder 12. This rotative movement is especially necessary because of the fact that the neck molds 26 are spread apart with resultant spaces at 34 (Fig. 1), as otherwise the glass would enter such spaces, and the shoulder 12 would not be fully circular.

In order to prevent the glass from entering the spaces 34, the upstanding portion 25a of the stem mold portion 25 is formed with wing portions or filler elements 35 that serve as wiping and supporting blocks to effect a smoothing action on the glass during rotation thereof.

When the glass has been fully expanded and then cooled somewhat, the mold sections 18 are swung apart to expose the bowl 10 and during said swinging movement, the inner end walls 36 of the slots engage the upper ends of the levers 28, thereby rocking said levers and causing their lower ends to force the rods 27 and the neck mold sections 26 inwardly.

The shoulders 26a of the neck molds are thus moved clear of the shoulders formed on the bowl, and the bowl may be lifted out of the mold, that portion of the blown glass adhering to the blow pipe will, of course, be cut away to remove the excess glass from the bowl 10 and leave the bowl in the form shown in Fig. 7, after which the upper edge of the bowl may be fire polished or otherwise smoothed in the usual manner.

The shoulders 26a preferably lie along arcs of a circle which they occupy when in expanded or ware-forming position as shown in Figs. 1 and 3, so that the glass can be rotated in the mold during the blowing operation, which causes the shoulder 12 formed on the glass to be of circular form. When the mold members 26 are moved together with their adjacent edges in abutting engagement, or into engagement with the sides of the stem mold 25a, the overhanging portions 26a will be clear of the bottom of the glass article.

I claim as my invention:—

1. A mold for plastic materials, comprising a pair of split side mold members, a second pair of mold members cooperating with the first-named members to form a mold cavity and having laterally projecting mold surfaces within said cavity, said pairs of members being movable in opposite directions into molding position, and lost motion connections between said pairs of members, arranged to effect expansive movement of one pair of members when the other members are moved toward each other.

2. A mold for plastic materials, comprising a pair of split side mold members, a second pair of members extending into the space between the first-named pairs and provided with overhanging shoulder portions within said space, and means for imparting movement in one direction to the second-named members relative to one another through relative movement of the first-named pair in the opposite direction.

3. A mold for plastic materials, comprising a pair of side mold members, a stem mold extending into the space between said members through the bottom walls thereof and having a cavity communicating with the space between the said members, and a second pair of mold members extending in a direction axially of said stem mold into said space and encircling the adjacent end of the stem mold, the last-named members being movable into cooperative position with the side mold members in directions radially of the stem mold, and having laterally-projecting mold surfaces within said space.

4. A mold for plastic materials, comprising a pair of side mold members, a stem mold extending into the space between said members through the bottom walls thereof and having a cavity communicating with the space between the said members, and a second pair of mold members extending in a direction axially of the stem mold into said space and encircling the adjacent end of the stem mold, the last-named members being movable radially of the stem mold into cooperative position with the side mold members, and having approximately semi-circular overhung shoulders on their inner ends in spaced relation to the adjacent mold surface of the side mold members.

5. A mold for plastic materials, comprising a pair of side mold members mounted for swinging movement, a bottom plate for supporting the said members, a stem mold extending through said bottom plate and communicating with the space between the side mold members, a pair of mold members partially embracing the stem mold and extending into the space between the side mold members, and means for slidably supporting the second-named members for movement radially of the stem mold.

6. A mold for plastic materials, comprising a pair of side mold members mounted for swinging movement, a bottom plate for supporting the said members, a stem mold extending through said bottom plate and communicating with the space between the side mold members, a pair of mold members partially embracing the stem mold and extending into the space between the side mold members, and a lost-motion connection between the second-named pair of members and the first-named pair for effecting radial movement of the second-named pair of members when the side mold members are opened or closed.

7. A mold for plastic material, comprising a pair of side mold members, a stem mold member extending into the space between said members through the bottom walls thereof and having a cavity communicating with the space between the said members, a pair of neck mold members having shoulders on their inner ends, and encircling the adjacent end of the stem mold and movable radially thereof with their adjacent edges in spaced relation, said neck mold members extending axially of the stem mold into said space, and radially extending wing portions on said stem mold member disposed between the said adjacent edges of the neck mold members.

8. Mold structure comprising a mold body provided with a cavity open at its upper end, a stem mold extending into said cavity through the bottom wall of said mold body and having an elongated recess communicating with said cavity, for forming a hollow stem on a blown glass article, a pair of opposed mold members encircling the end of said stem mold within said cavity and being movable in opposite directions radially thereof into molding position, and peripheral shoulders on the inner ends of said mold members, disposed in overhanging relation relative to the said bottom wall when said members are moved into molding position.

9. Mold structure comprising a mold body provided with a cavity open at its upper end, a stem mold extending into said cavity through the bottom wall of said mold body and having an elongated recess communicating with said cavity, for forming a hollow stem on a blown glass article, a pair of opposed mold members encircling the end of said stem mold within said cavity and being movable in opposite directions radially thereof into molding position, and peripheral shoulders on the inner ends of said mold members, disposed in overhanging relation relative to the said bottom wall when said members are moved into molding position, the inner faces of said mold members and said stem mold being disposed in a common plane and constituting concentric mold surfaces.

10. Mold structure comprising a mold body provided with a cavity open at its upper end, a stem mold extending into said cavity through the bottom wall of said mold body and having an elongated recess communicating with said cavity, for forming a hollow stem on a blown glass article, a pair of opposed mold members encircling the end of said stem mold within said cavity and having peripheral shoulders on their inner ends, said mold members being movable in opposite directions radially of said stem mold into molding position, the inner faces of said mold members and said stem mold constituting radially-spaced concentric mold surfaces, and means extending radially of said stem mold and spanning the radial space between said mold members and the stem mold, for maintaining the said radial space free of plastic material.

11. Mold structure comprising side mold members forming a mold cavity open at its upper end, a stem mold extending into said cavity through the bottom walls of said members, and having a cavity communicating through the inner end of said stem mold with the first-named cavity, the bottom walls of said mold members extending radially from and circumferentially of the side wall of the stem mold in a plane below the upper end of the stem mold, to form an annular space around the upper portion of the stem mold, and a pair of neck mold members of approximately semi-cylindrical form mounted in said annular space for movement radially of said stem mold and the bottom walls of said mold members, and having laterally-projecting shoulders on their inner ends.

12. Mold structure comprising side mold members forming a mold cavity open at its upper end, a stem mold extending into said cavity through the bottom walls of said members, and having a cavity communicating through the inner end of said stem mold with the first-named cavity, the bottom walls of said mold members extending radially from and circumferentially of the side wall of the stem mold, in a plane below the upper end of the stem mold, to form an annular space around the upper portion of the stem mold, a pair of neck mold members of approximately semi-cylindrical form mounted in said annular space for movement radially of said stem mold and the bottom walls of said mold members, and having laterally-projecting shoulders on their inner ends, the adjacent edges of said neck mold members being normally spaced apart, and stationary filler elements disposed in said annular space in position between the spaced edges of said neck mold members.

LOUIS POGLEIN.